(12) United States Patent
Nishii

(10) Patent No.: US 12,304,065 B2
(45) Date of Patent: May 20, 2025

(54) QUATERNION JOINT

(71) Applicant: TOYOTA JIDOSHA KABUSHIKI KAISHA, Toyota (JP)

(72) Inventor: Kazutoshi Nishii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/378,196

(22) Filed: Oct. 10, 2023

(65) Prior Publication Data

US 2024/0131731 A1  Apr. 25, 2024
US 2024/0227211 A9  Jul. 11, 2024

(30) Foreign Application Priority Data

Oct. 21, 2022   (JP) .................................. 2022-169445

(51) Int. Cl.
*B25J 17/00*   (2006.01)
*B25J 9/10*    (2006.01)
*B25J 17/02*   (2006.01)

(52) U.S. Cl.
CPC ........... *B25J 17/0283* (2013.01); *B25J 9/104* (2013.01)

(58) Field of Classification Search
CPC ..... B25J 17/0283; B25J 9/104; B25J 17/0266
See application file for complete search history.

(56) References Cited

U.S. PATENT DOCUMENTS

| 11,660,764 | B2 * | 5/2023 | Kim ..................... B25J 17/0266 |
| | | | 74/490.06 |
| 2021/0197407 | A1 | 7/2021 | Kim et al. |
| 2024/0131731 | A1 * | 4/2024 | Nishii .................. B25J 17/0283 |
| 2024/0133422 | A1 * | 4/2024 | Nishii ................. F16C 11/0685 |

OTHER PUBLICATIONS

Kim et.al., "Quaternion Joint: Dexterous 3-DOF Joint Representing Quaternion Motion for High-Speed Safe Interaction", IEEE/RSJ International Conference on Intelligent Robots and Systems (IROS) Madrid, Spain, Oct. 5, 2018, pp. 935-942, https://ieeexplore.ieee.org/stamp/stamp.jsp?arnumber=8594301 (Year: 2018).*

* cited by examiner

*Primary Examiner* — Victor L MacArthur
(74) *Attorney, Agent, or Firm* — Dinsmore & Shohl LLP

(57) ABSTRACT

A quaternion joint includes a first member, a second member rotatably connected to the first member through links, a plurality of first pulleys provided on the end face of the first member so that the first pulleys are able to swing, a plurality of second pulleys provided on the end face of the second member facing the end face of the first members so that the second pulleys correspond to the first pulleys and so that the second pulleys are able to swing, and a plurality of wires hung between the first pulleys and the second pulleys corresponding to the first pulleys. A rotation shaft of the first pulley is offset from a rotation shaft of the second pulley corresponding to the first pulley in a state in which the rotation shaft of the first pulley is rotated around a direction in which the wire is extended.

3 Claims, 7 Drawing Sheets

INTERFERENCE WITH WIRE

⬇ AVOID INTERFERENCE

CANTILEVER STRUCTURE

⬇ REDUCE INCREASE OF MOMENT

BOTH-END SUPPORT STRUCTURE

QUATERNION JOINT

CROSS REFERENCE TO RELATED APPLICATIONS

This application is based upon and claims the benefit of priority from Japanese patent application No. 2022-169445, filed on Oct. 21, 2022, the disclosure of which is incorporated herein in its entirety by reference.

BACKGROUND

The present disclosure relates to a quaternion joint.

A quaternion joint including a plurality of first pulleys provided on an end face of a first member so that they can swing, a plurality of second pulleys provided on an end face of a second member facing the end face of the first member so that they can swing and correspond to the first pulleys, and a wire hung between the first pulley and the second pulley corresponding to the first pulley is known (see, for example, United States Patent Application Publication No. 2021/0197407).

In the aforementioned quaternion joint, a rotation shaft of the first pulley and a rotation shaft of the second pulley corresponding to the first pulley are disposed in parallel.

SUMMARY

Incidentally, in the aforementioned quaternion joint, since a moving pulley structure formed by stacking a plurality of pulleys is employed (FIG. 2), a wire that is obliquely hung is present (FIG. 3). Since the wire that is obliquely hung can easily come off the pulley, providing of a component that guides the wire is required. Providing of this guide component may lead to an increase in the weight of the components. Further, two degrees of freedom of the pulley are coaxially arranged, which may lead to an increase in the size of the mechanism.

The present disclosure has been made to solve the above problems, and one of the main objects thereof is to provide a quaternion joint in which both the weight of components thereof and the size of a mechanism thereof can be reduced.

In order to achieve the above-described object, one exemplary aspect according to the present disclosure is a quaternion joint including a first member and a second member rotatably connected to the first member through a plurality of links, the links being arranged in the quaternion joint so that a hemispherical shape that is a trajectory of an intersection point of the links is formed on respective end faces of the first and the second members and the second member is rotated while the hemispherical shapes are in contact with each other at the intersection point, the quaternion joint including:
 a plurality of first pulleys provided on the end face of the first member so that the first pulleys are able to swing;
 a plurality of second pulleys provided on the end face of the second member facing the end face of the first members so that the second pulleys correspond to the first pulleys and so that the second pulleys are able to swing; and
 a plurality of wires hung between the first pulleys and the second pulleys corresponding to the first pulleys,
 in which a rotation shaft of the first pulley is offset from a rotation shaft of the second pulley corresponding to the first pulley in a state in which the rotation shaft of the first pulley is rotated around a direction in which the wire is extended.

In the above one exemplary aspect, the rotation shaft of the first pulley may be offset from the rotation shaft of the second pulley corresponding to the first pulley in a state in which the rotation shaft of the first pulley is rotated by 90° around the direction in which the wire is extended.

In the above one exemplary aspect, a distance between a center of the first pulley and a center of the second pulley corresponding to the first pulley may be set to L, a distance between the rotation shaft of the second pulley and a swing shaft of the second pulley may be set to a, and a distance between the rotation shaft of the first pulley and a swing shaft of the first pulley may be set to b, and the parameters L, a, and b may be set so as to satisfy the following expression of a constraint condition.

$$b = \frac{a}{1 + \frac{2a}{(\sqrt{2} - 2)(L + a)}}$$ [Expression 1]

In the above one exemplary aspect, the rotation shaft of the first pulley may be offset from the swing shaft of the first pulley in a state in which the rotation shaft of the first pulley is rotated by 90° around the direction in which the wire is extended, and the rotation shaft of the second pulley may be offset from the swing shaft of the second pulley in a state in which the rotation shaft of the second pulley is rotated by 90° around the direction in which the wire is extended.

In the above one exemplary aspect, the rotation shaft of the first pulley and the swing shaft of the first pulley may be disposed side by side in the direction in which the wire is extended, and the rotation shaft of the second pulley and the swing shaft of the second pulley may be disposed side by side in the direction in which the wire is extended.

According to the present disclosure, it is possible to provide a quaternion joint in which both the weight of components thereof and the size of a mechanism thereof can be reduced.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

An embodiment according to the present disclosure will be described hereinafter with reference to the drawings. A quaternion joint according to this embodiment is mounted on a joint part such as a wrist joint of a robot.

Figure 1:
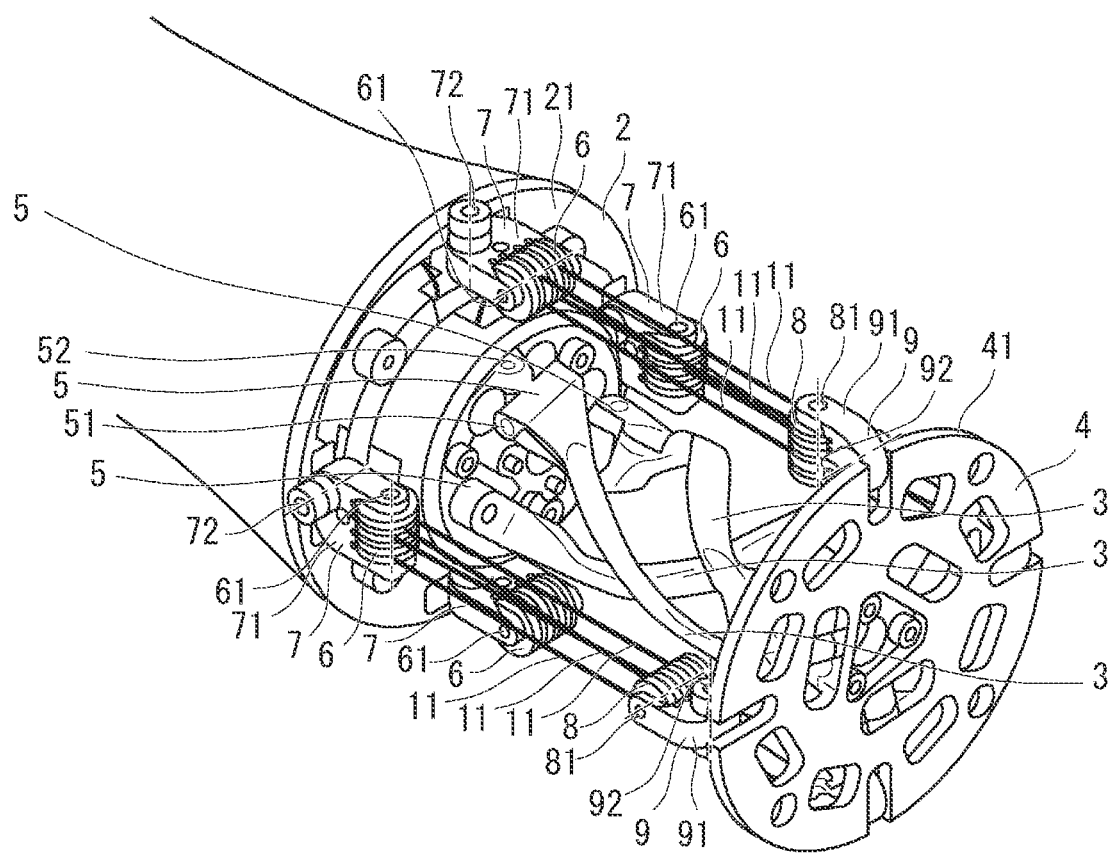
FIG. 1 is a perspective view of a quaternion joint according to an embodiment.

FIG. 1 is a perspective view of the quaternion joint according to this embodiment. A quaternion joint 1 includes a first member 2 and a second member 4 rotatably connected to the first member 2 through a plurality of links 3 that intersect each other in a side view.

Both ends of each of the links 3 are connected to end faces 21 and 41 of the first and second members 2 and 4, respectively, through a swing mechanism 5. The swing mechanism 5 can swing the links 3 in any direction by rotating the links 3 around two rotation shafts, that is, first and second rotation shafts 51 and 52, arranged so that they are perpendicular to each other and stacked on each other. During this swinging, each of the links 3 is bent so as to avoid interference between the links 3.

In the quaternion joint 1, each of the links 3 is disposed so that an imaginary hemispherical shape, which is a trajectory of an intersection point of the links 3, is formed on each of the end face 21 of the first member 2 and the end face 41 of the second member 4 and that the second member 4 is rotated while the hemispherical shapes are in contact with each other at the intersection point.

Note that, in this embodiment, although the number of links 3 is three, it is not limited thereto, and the number of links 3 may be set to any number, e.g., two, four, or larger, if the above operation condition is satisfied.

Four first pulleys 6 are attached to the end face 21 of the first member 2 via a swing mechanism 7. The first pulleys 6 are provided on the end face 21 of the first member 2, for example, circumferentially at equal intervals of 90°. The swing mechanism 7 includes pulley holding parts 71 that hold the first pulleys 6 and swing shafts 72 penetrating the pulley holding parts 71.

The first pulley 6 swings in the circumferential direction around the swing shaft 72. The first pulley 6 has a structure in which a plurality of pulleys are stacked in the lateral direction, and a rotation shaft 61 penetrates the center of each of the pulleys. The first pulley 6 is rotated around the rotation shaft 61. The rotation shaft 61 of the first pulley 6 is disposed so as to be perpendicular to the swing shaft 72.

That is, the rotation shaft 61 of the first pulley 6 is offset from the swing shaft 72 in a state in which the rotation shaft 61 is rotated by 90° around a direction in which a wire 11 is extended. Further, the rotation shaft 61 and the swing shaft 72 of the first pulley 6 are arranged side by side so as to be stacked in the direction in which the wire 11 is extended.

Four second pulleys 8 are attached to the end face 41 of the second member 4 facing the end face 21 of the first member 2 via a swing mechanism 9 so that they correspond to the first pulleys 6. The second pulleys 8 are provided on the end face 41 of the second member 4, for example, circumferentially at equal intervals of 90°. The swing mechanism 9 includes pulley holding parts 91 that hold the second pulleys 8 and swing shafts 92 penetrating the pulley holding parts 91.

The second pulley 8 swings in the radial direction around the swing shaft 92. The second pulley 8 has a structure in which a plurality of pulleys are stacked in the lateral direction, and a rotation shaft 81 penetrates the center of each of the pulleys. The second pulley 8 is rotated around the rotation shaft 81. The rotation shaft 81 of the second pulley 8 is disposed so as to be perpendicular to the swing shaft 92.

That is, the rotation shaft 81 of the second pulley 8 is offset from the swing shaft 92 in a state in which the rotation shaft 81 is rotated by 90° around the direction in which the wire 11 is extended. Further, the rotation shaft 81 and the swing shaft 92 of the second pulley 8 are arranged side by side so as to be stacked in the direction in which the wire 11 is extended.

The wire 11 is hung between the first pulley 6 and the second pulley 8 corresponding to the first pulley 6. By pulling the wire 11, the second member 4 can be rotated with respect to the first member 2 in a roll direction, a pitch direction, and the like via the plurality of links 3.

Note that four first pulleys 6 are provided on the end face 21 of the first member 2 and four second pulleys 8 are provided on the end face 41 of the second member 4. However, the present disclosure is not limited thereto. The number of first and second pulleys 6 and 8 provided on the end faces 21 and 41 of the first and the second members 2 and 4 may be any number.

Figure 2:
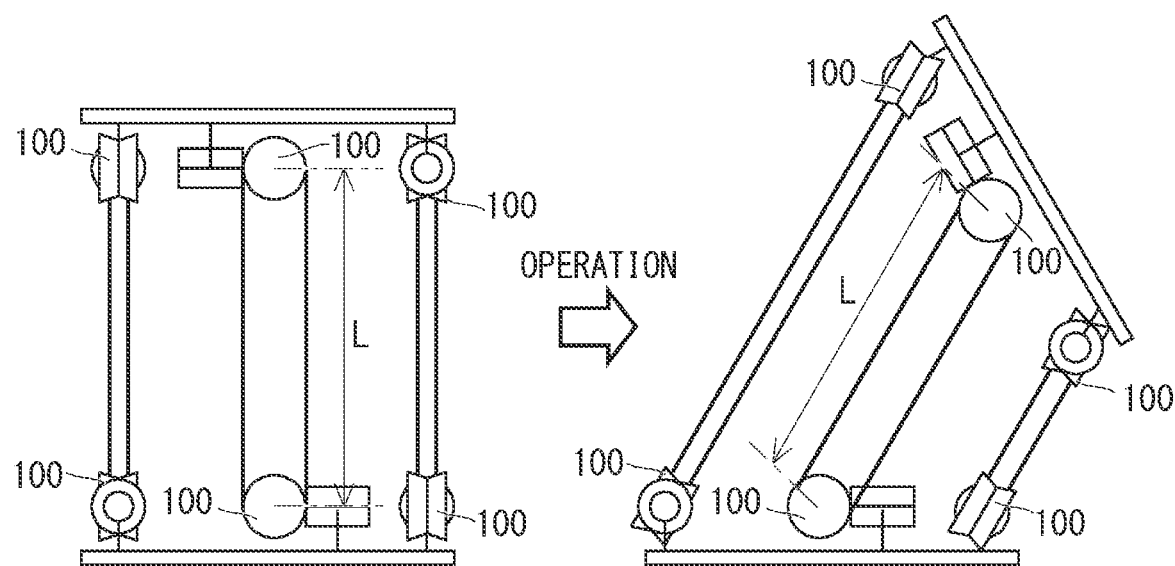
FIG. 2 is a diagram showing a structure in which two degrees of freedom of a pulley are coaxially arranged.

Incidentally, regarding the operation of two degrees of freedom of the quaternion joint, it is required that when one degree of freedom is moved, a wire length L (a distance between pulleys) in the other degree of freedom is not changed as shown in FIG. 2. Therefore, a conventional structure in which two degrees of freedom of a pulley 100 are coaxially arranged has been adopted.

Figure 3:
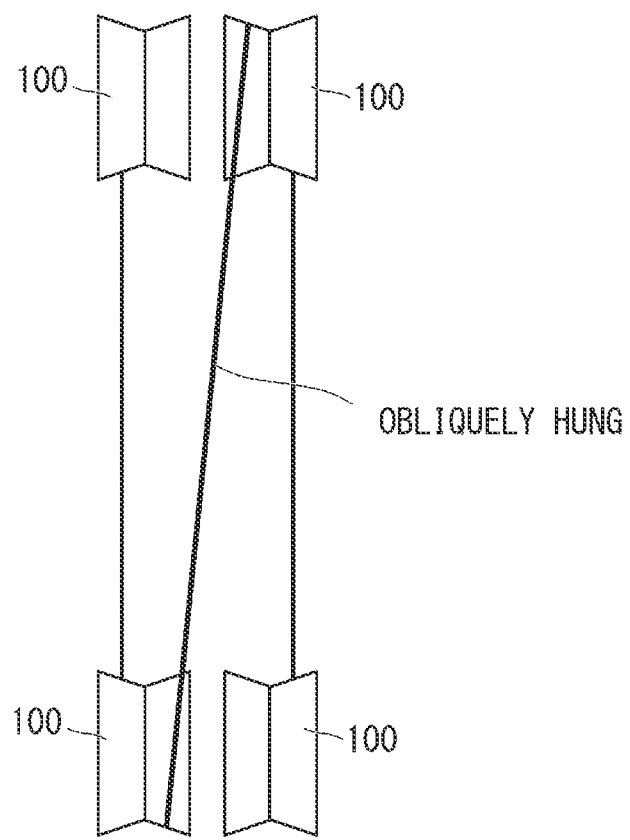
FIG. 3 is a diagram showing a structure in which a wire that is obliquely hung is present.

Further, since a moving pulley structure formed by stacking a plurality of pulleys 100 is employed, a wire that is obliquely hung is present as shown in FIG. 3. When the wire is tensioned, it attempts to approach a vertical state, that is, the minimum distance. Therefore, a wire that is obliquely hung can easily come off the pulley 100, a component for guiding the wire is required. This may lead to an increase in the weight of the components.

Figure 4A:
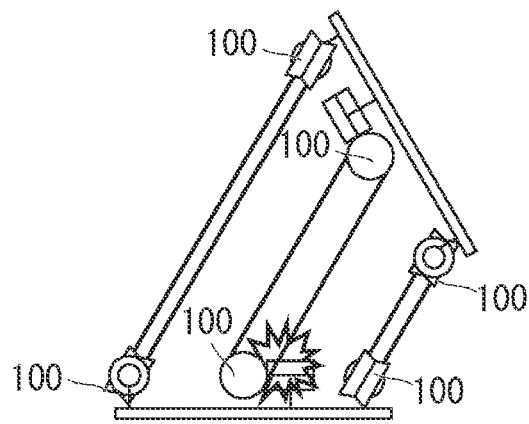
FIG. 4A is a diagram of a conventional structure in which two degrees of freedom of a pulley are coaxially arranged that may cause interference.
Figure 4B:
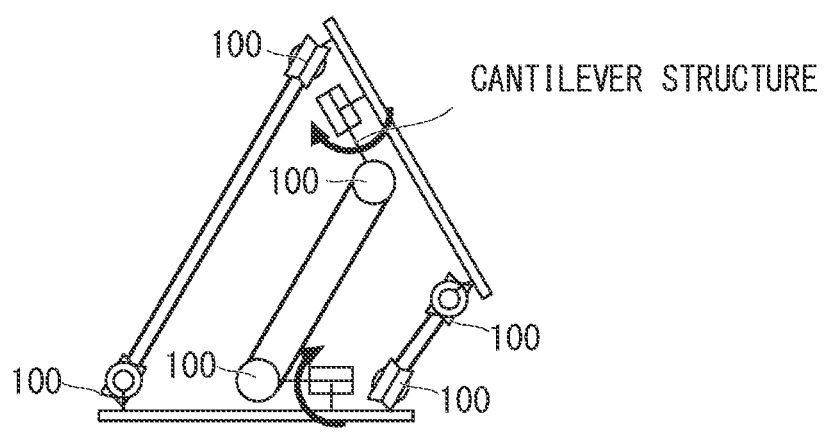
FIG. 4B is a diagram of a conventional structure that is supported by a cantilever structure.
Figure 4C:
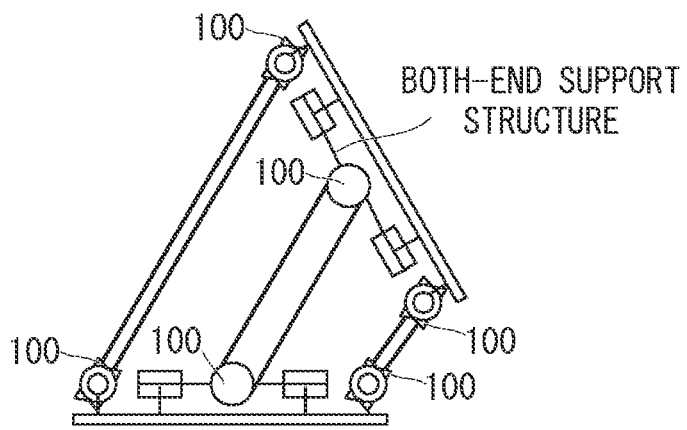
FIG. 4C is a diagram of a conventional structure that is supported by a both-end support structure.

Further, the conventional structure in which two degrees of freedom of the pulley 100 are coaxially arranged may cause interference of the wire as shown in FIG. 4A. In order to avoid this interference, for example, it is assumed that the pulley 100 shown in FIG. 4B is supported by a cantilever structure. Further, in order to reduce the increase of the moment to the support member, it is assumed that the pulley 100 is supported by a both-end support structure shown in FIG. 4C. This may cause an increase in the size of the mechanism.

On the other hand, in the quaternion joint 1 according to this embodiment, as shown in FIG. 1, the rotation shaft 61 of the first pulley 6 is offset from the rotation shaft 81 of the second pulley 8 corresponding to the first pulley 6 in a state in which the rotation shaft 61 is rotated around the direction in which the wire 11 is extended.

Figure 5:
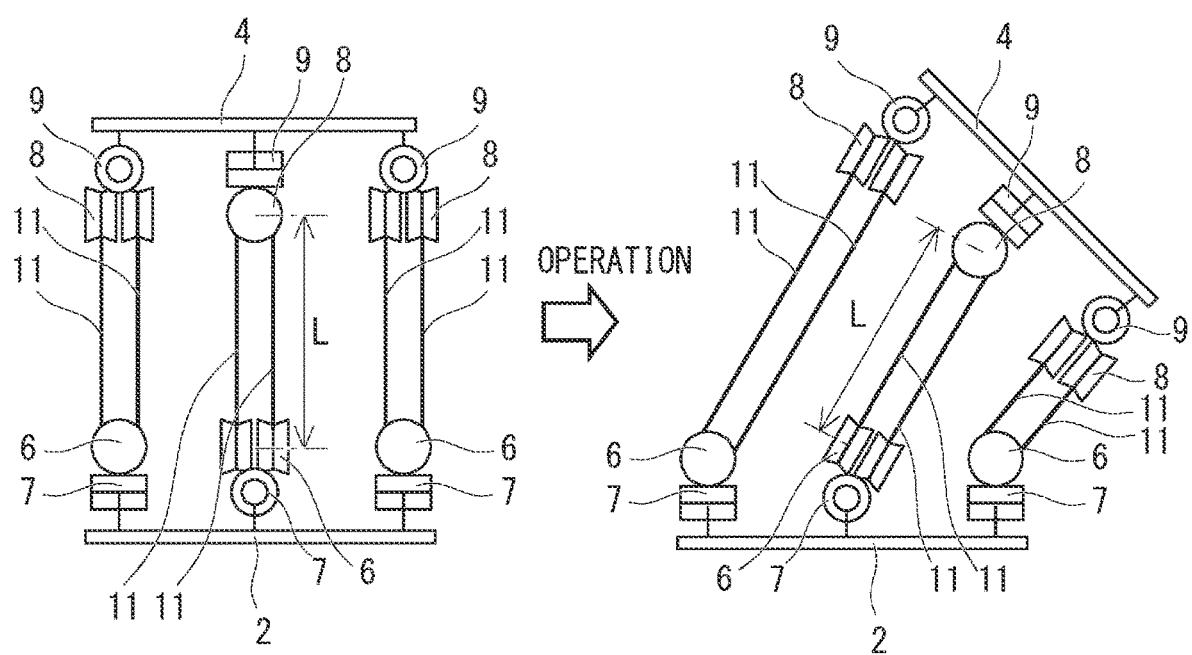
FIG. 5 is a diagram showing the positions of the first and the second pulleys according to the embodiment.

By the above structure, as shown in FIG. 5, regarding the operation of two degrees of freedom of the quaternion joint 1, an arrangement can be made so that when one degree of freedom is moved, the wire length L (the distance between pulleys) in the other degree of freedom is not changed.

Further, since the interference of the wire 11 described above can be avoided by this arrangement, a cantilever structure or a both-end support structure of the pulley described above is not required and thus the size of the mechanism can be reduced.

The rotation shaft 61 of the first pulley 6 is offset from the rotation shaft 81 of the second pulley 8 corresponding to the first pulley 6 in a state in which the rotation shaft 61 is rotated by, for example, 90° around the direction in which the wire 11 is extended.

Further, as described above, the rotation shaft 61 of the first pulley 6 is offset from the rotation shaft 81 of the corresponding second pulley 8 in a state in which the rotation shaft 61 is rotated by 90° around the direction in which the wire 11 is extended, and the first pulley 6 and the corresponding second pulley 8 are alternately disposed. Note that the range of 90° above also includes a range around 90° due to design errors etc.

The above structure eliminates the need for the above-described wire guide that prevents a wire from coming off, since there is no wire 11 that is obliquely hung. Therefore, the weight of the components can be reduced. That is, both the weight of the components and the size of the mechanism can be reduced.

Note that, in this embodiment, although the rotation shaft 61 of the first pulley 6 is offset from the rotation shaft 81 of the second pulley 8 corresponding to the first pulley 6 in a state in which the rotation shaft 61 is rotated, the present disclosure is not limited thereto, and taking the shape of the first and the second pulleys 6 and 8, the twist of the wire 11, etc. into account, an angle in the range of, for example, 85° to 95° may be used, and any angle may be used if the above-described arrangement can be made and there is no wire 11 that is obliquely hung.

Figure 6:
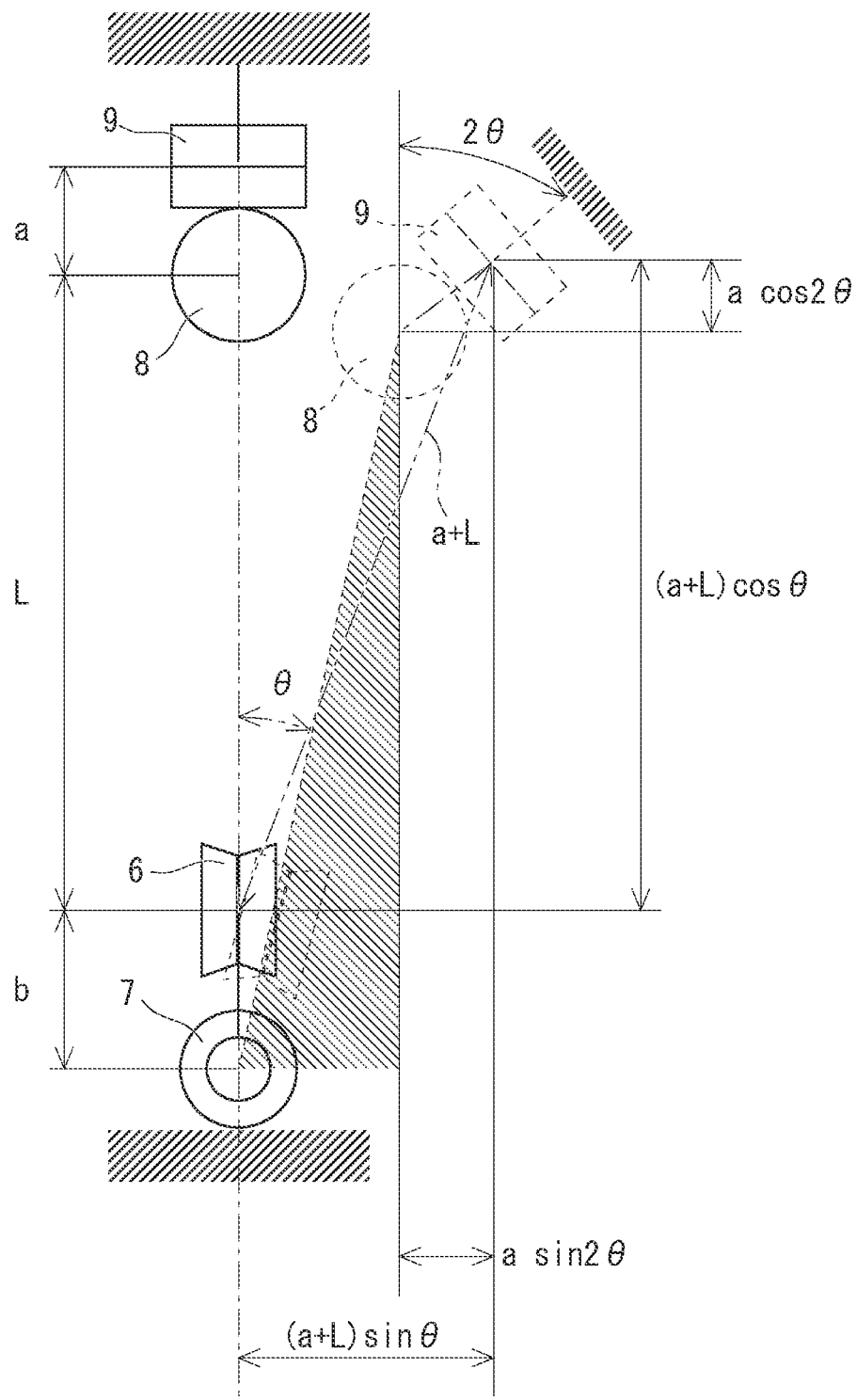
FIG. 6 is a diagram showing parameters of a constraint condition.

Next, a constraint condition for making the wire length correspond to the link length in the above-described quaternion joint 1 will be described. FIG. 6 is a diagram showing parameters of the constraint condition.

As shown in FIG. 6, an angle of the inclination of the central link 3 is set to θ, a distance between the center of the rotation shaft 61 of the first pulley 6 and the center of the rotation shaft 81 of the corresponding second pulley 8 is set to L, a distance between the rotation shaft 81 and the swing shaft 92 of the second pulley 8 is set to a, and a distance between the rotation shaft 61 and the swing shaft 72 of the first pulley 6 is set to b. The following expression of the constraint condition can be derived using the above parameters L, a, and b from the geometric relationships shown in FIG. 6.

$$b = \frac{a}{1 + \frac{2a}{(\sqrt{2} - 2)(L + a)}}$$ [Expression 2]

By setting the parameters L, a, and b so as to satisfy the above expression of the constraint condition, the wire length can be made to correspond to the central link length in the above-described quaternion joint 1.

Figure 7:
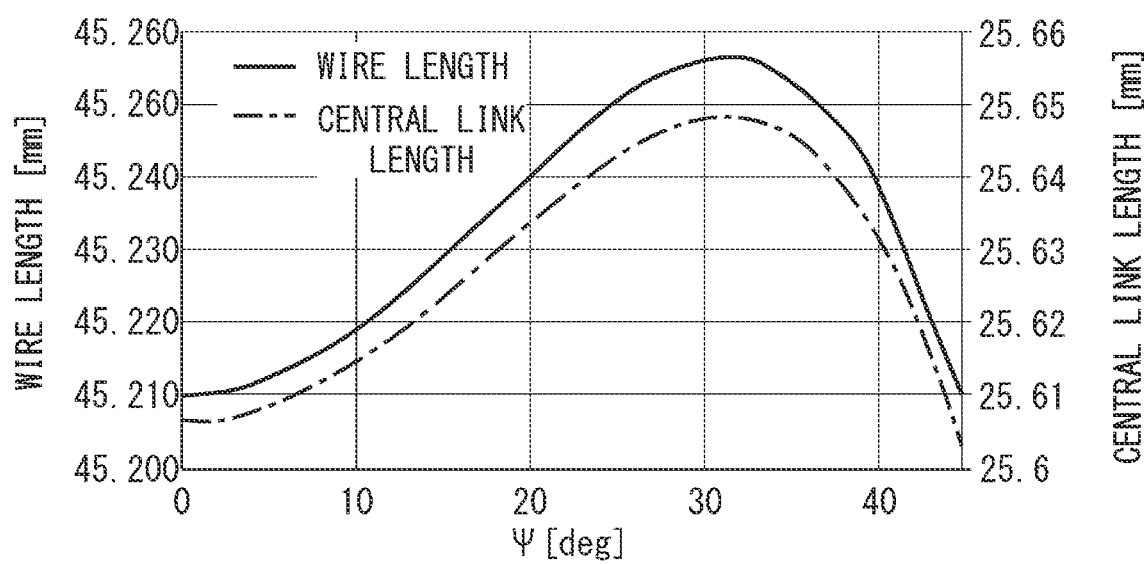
FIG. 7 is a diagram showing changes in a central link length and a wire length when parameters are set in accordance with the constraint condition.

FIG. 7 is a diagram showing changes in a central link length and a wire length when the parameters L, a, and b are set in accordance with the above constraint condition. In FIG. 7, the horizontal axis shows an operating angle ψ [deg] of the link, the vertical axis on the left shows a wire length [mm], and the vertical axis on the right shows a central link length [mm].

As shown in FIG. 7, changes in the wire length parallel changes in the central link length. Therefore, the extension and contraction of the wire due to the operation of the link 3 can be reduced.

Several novel embodiments according to the present disclosure have been described above. However, these embodiments are merely presented as examples and are not intended to limit the scope of the disclosure. These novel embodiments can be implemented in various forms. Further, their components/structures may be omitted, replaced, or modified without departing from the scope and the spirit of the disclosure. These embodiments and modifications thereof are included in the scope and the spirit of the disclosure and also included in the disclosure specified in the claims and the scope equivalent thereto.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A quaternion joint comprising a first member and a second member rotatably connected to the first member through a plurality of links, the quaternion joint comprising:
a plurality of first pulleys provided on the end face of the first member so that the first pulleys are able to swing;
a plurality of second pulleys provided on the end face of the second member facing the end face of the first members so that the second pulleys correspond to the first pulleys and so that the second pulleys are able to swing; and
a plurality of wires hung between the first pulleys and the second pulleys corresponding to the first pulleys,
wherein a rotation shaft of one of the first pulleys is angularly offset from a rotation shaft of one of the second pulleys, which corresponds to the one of first pulleys by commonly carrying one of the plurality of wires, by 90° around the direction in which the wire is extended.

2. The quaternion joint according to claim 1, wherein the rotation shaft of the first pulley is angularly offset from a swing shaft of the first pulley by 90° around the direction in which the wire is extended, and the rotation shaft of the second pulley is angularly offset from a swing shaft of the second pulley by 90° around the direction in which the wire is extended.

3. The quaternion joint according to claim 1, wherein the rotation shaft of the first pulley and a swing shaft of the first pulley are disposed side by side in the direction in which the wire is extended, and the rotation shaft of the second pulley and a swing shaft of the second pulley are disposed side by side in the direction in which the wire is extended.

* * * * *